US006853934B2

(12) United States Patent
Nagamatsu

(10) Patent No.: US 6,853,934 B2
(45) Date of Patent: Feb. 8, 2005

(54) SYSTEM AND METHOD FOR REMOTE DATA ACQUISITION, MONITORING AND CONTROL

(75) Inventor: Brian H. Nagamatsu, Glenville, NY (US)

(73) Assignee: General Electric Company, Schenectady, NY (US)

( * ) Notice: Subject to any disclaimer, the term of this patent is extended or adjusted under 35 U.S.C. 154(b) by 359 days.

(21) Appl. No.: 10/032,494

(22) Filed: Jan. 2, 2002

(65) Prior Publication Data

US 2003/0125890 A1 Jul. 3, 2003

(51) Int. Cl.[7] .............................................. G06F 19/00
(52) U.S. Cl. ......................................... 702/77; 702/56
(58) Field of Search .......................... 702/77, 56, 183, 702/184; 340/870.16; 356/484, 241.1; 318/800; 361/51; 324/142; 600/300; 73/593

(56) References Cited

U.S. PATENT DOCUMENTS

| | | | | |
|---|---|---|---|---|
| 4,255,707 A | * | 3/1981 | Miller | 324/142 |
| 4,286,214 A | * | 8/1981 | Milkovic | 324/142 |
| 5,004,339 A | * | 4/1991 | Pryor et al. | 356/241.1 |
| 5,448,230 A | | 9/1995 | Schanker et al. | |
| 5,521,482 A | * | 5/1996 | Lang et al. | 318/800 |
| 5,602,708 A | * | 2/1997 | Felgenhauer | 361/51 |
| 5,682,236 A | * | 10/1997 | Trolinger et al. | 356/484 |
| 5,717,718 A | | 2/1998 | Rowsell et al. | |
| 5,736,937 A | * | 4/1998 | McGirr et al. | 340/870.16 |
| 5,790,977 A | | 8/1998 | Ezekiel | |
| 5,815,488 A | | 9/1998 | Williams et al. | |
| 5,854,994 A | * | 12/1998 | Canada et al. | 702/56 |
| 5,953,371 A | | 9/1999 | Rowsell et al. | |
| 6,006,615 A | | 12/1999 | Uttinger | |
| 6,032,137 A | | 2/2000 | Ballard | |
| 6,049,720 A | | 4/2000 | Rude | |
| 6,178,821 B1 | | 1/2001 | Savkar et al. | |
| 6,263,738 B1 | | 7/2001 | Hogle | |
| 6,292,128 B1 | | 9/2001 | Tsui et al. | |
| 6,434,512 B1 | * | 8/2002 | Discenzo | 702/184 |
| 6,484,109 B1 | * | 11/2002 | Lofall | 702/56 |
| 6,670,887 B2 | * | 12/2003 | Dungan | 340/632 |
| 6,687,654 B2 | * | 2/2004 | Smith, Jr. et al. | 702/183 |
| 2001/0056225 A1 | * | 12/2001 | DeVito | 600/300 |
| 2002/0169569 A1 | * | 11/2002 | Miller | 702/56 |
| 2003/0066352 A1 | * | 4/2003 | Leamy ey al. | 73/593 |

* cited by examiner

*Primary Examiner*—Bryan Bui
*Assistant Examiner*—Xiuqin Sun
(74) *Attorney, Agent, or Firm*—Ernest G. Cusick; Philip D. Freedman

(57) ABSTRACT

A system comprises a remotely situated plurality of sensors that sense information; a locally situated workstation that receives the information from the remotely situated plurality of sensors in the form of a set of data; and a Fast Fourier Transform (FFT) analyzer interfaced with the plurality of sensors and workstation to receive information from the plurality of sensors in the form of time domain data points, to transform the data points into a lesser number of frequency domain data points to facilitate transmission as a set of data from the plurality of sensors to the locally situated workstation. Another system comprises a remotely situated sensor that senses information; a remotely situated data acquisition system interfaced with the sensor to receive data from the sensor; a Fast Fourier Transform (FFT) analyzer interfaced with the sensor in parallel with the data acquisition system to receive information from the sensor in the form of time domain data points and to transform the data points into a lesser number of frequency domain data points to facilitate transmission; and a locally situated workstation that receives the data from the data acquisition system, that receives the frequency domain data points from the FFT analyzer and that controls the sensor via input in response to the data and data points. A method comprises remotely monitoring an operating test object with a plurality of sensors to generate time domain data points; remotely transforming the time domain data points to frequency domain data points with a Fast Fourier Transform (FFT) analyzer; and transmitting the frequency domain data points to a local workstation.

46 Claims, 4 Drawing Sheets

SYSTEM AND METHOD FOR REMOTE DATA ACQUISITION, MONITORING AND CONTROL

BACKGROUND OF THE INVENTION

The present invention relates to a system and method for remotely acquiring and selecting data for monitoring and analysis.

A remote data acquisition system can be used to acquire sensor data from a sensor attached to a test object. Transmission of sensor data from the remote data acquisition system is limited by bandwidth and speed of the communications link to the central control system. Increased separation of the remote data acquisition system from the central control system exacerbates the transmission bandwidth and speed problems.

Another problem is that a remote data acquisition system may be located where only low speed analog phone line transmission is available. This further slows transmission of remotely acquired data.

The problem of remote data transmission is more severe in the case of vibration data transmission. Generally, vibration data is sampled at at least twice a desired frequency. For example, if the desired frequency is 50 kHz, then the sampling frequency is at least 100 kHz. If the data acquisition system is sampling data from 200 sensors, then the data acquisition system is acquiring the data at a rate of at least 20 million data points per second. Sending data at this rate across the communication link may not be possible.

Additionally, it would be advantageous for an operator working at a remote workstation to be able to communicate with a sensor central control system. An operator may desire to both view sensor data stored on a central control system and also control operation of the remote sensor.

A system and method are needed to transmit large amounts of sampling data. Additionally, a system and method are needed that permit communication from a remote workstation.

BRIEF SUMMARY OF THE INVENTION

The present invention provides such a system and method. The system includes a FFT (Fast Fourier Transform) analyzer located at a remote location from a central control system. The method permits the compression of large amounts of data to facilitate transmission. The invention provides for back and forth communication between remote and local system architecture.

In the invention, a system comprises a remotely situated plurality of sensors that sense information; a locally situated workstation that receives the information from the remotely situated plurality of sensors in the form of a set of data; and a Fast Fourier Transform (FFT) analyzer interfaced with the plurality of sensors and workstation to receive information from the plurality of sensors in the form of time domain data points, to transform the data points into a lesser number of frequency domain data points to facilitate transmission as a set of data from the plurality of sensors to the locally situated workstation.

In an embodiment, a system comprises a remotely situated sensor that senses information; a remotely situated data acquisition system interfaced with the sensor to receive data from the sensor, a Fast Fourier Transform (FFT) analyzer interfaced with the sensor in parallel with the data acquisition system to receive information from the sensor in the form of time domain data points and to transform the data points into a lesser number of frequency domain data points to facilitate transmission; and a locally situated workstation that receives the data from the data acquisition system, that receives the frequency domain data points from the FFT analyzer and that controls the sensor via input in response to the data and data points.

In another embodiment, a system comprises a remotely situated plurality of sensors that sense information; a data acquisition system for acquiring digitized sensor signals from the plurality of sensors; an interface device that converts the digitized sensor signals into an output data signal transmission stream; a transmission apparatus that transmits the output data signal transmission stream from the interface device; a local interface device situated remote from the sensors that receives the output data signal transmission stream from the transmission apparatus and converts the output data signal transmission stream into a digital central control system data input; a central control system that receives the digital central control system data input and sends the data input as a set of central processed data; a central processing transmission apparatus that relays the sent set of central processed data; a locally situated workstation that receives the sent set of central processed data from the central processing transmission apparatus; and a Fast Fourier Transform (FFT) analyzer interfaced with the plurality of sensors and workstation to receive information from the plurality of sensors in the form of time domain data points, to transform the data points into a lesser number of frequency domain data points that can be digitized by the interface device to facilitate transmission as a set of output data signal transmission stream from the plurality of sensors to the transmission apparatus.

Additionally, the invention is a method comprising remotely monitoring an operating test object with a plurality of sensors to generate time domain data points; remotely transforming the time domain data points to frequency domain data points with a Fast Fourier Transform (FFT) analyzer; and transmitting the frequency domain data points to a local workstation.

In another embodiment of the invention, a method comprises remotely monitoring an operating test object with a plurality of sensors to generate sensor signals; remotely digitizing the sensor signals; remotely converting the digitized sensor signals into an output data signal transmission stream; transmitting the output data signal transmission stream to a local interface device; converting the output data signal transmission stream at the local interface device into a digital central control system data input; sending the set of the central transmission processed data through a central processing transmission apparatus to a workstation; displaying the set of central transmission processed data at a workstation display wherein an operator views the processed data; selecting a sensor and inputting a selected sensor command according to the displayed set of central transmission processed data; transmitting the selected sensor command through the central processing transmission apparatus to a remote controlled switching apparatus; and selecting a sensor according to the selected sensor command in the remote controlled switching apparatus.

BRIEF DESCRIPTION OF THE DRAWINGS

The following detailed description of the invention is presented in connection with the accompanying drawings wherein.

DETAILED DESCRIPTION OF THE INVENTION

Figure 1:
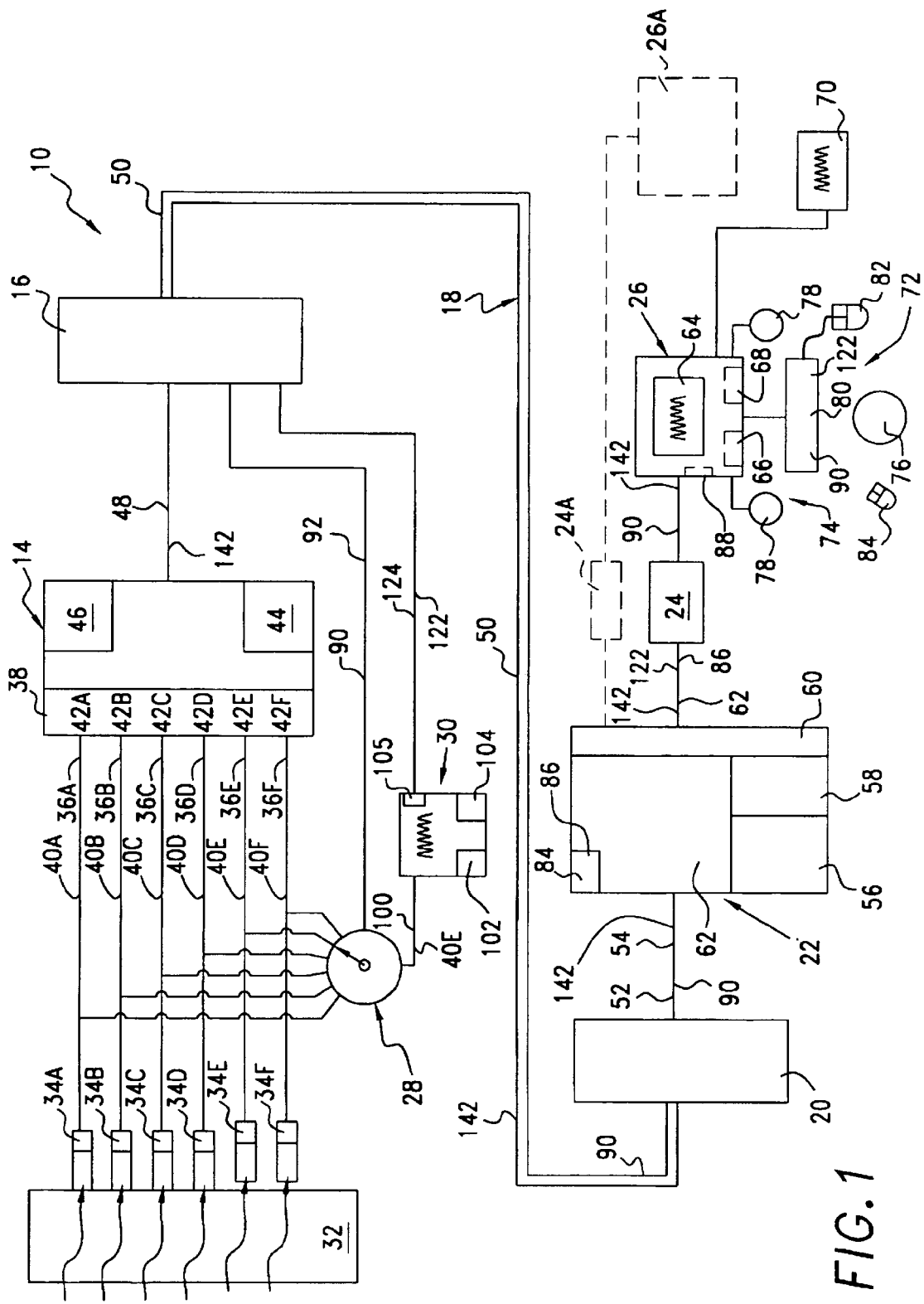
FIG. 1 is a schematic view of a remote data acquisition, monitoring and control system.

According to an aspect of the invention, a remote data acquisition system acquires sensor signals from a plurality of sensors. In this specification, the term "remote" means non-integrated with and "off site" from local system architecture. The system includes a remote controlled switching apparatus and an FFT apparatus located near the plurality of sensors. An operator can be seated at a workstation located at a distance from the remote controlled switching apparatus and FFT apparatus. The operator can remotely control the switching apparatus and the FFT apparatus display. In operation, the operator enters a selected sensor command into the workstation to select a sensor from the plurality of sensors. A selected sensor signal is transmitted to the FFT that transforms a number of time domain data points into a lesser number of frequency domain data points to facilitate transmission to the workstation and that can process the selected sensor signal into an FFT display.

These and other features will become apparent from the drawings and following detailed discussion, which by way of example without limitation describe preferred embodiments of the invention. In the drawings, corresponding reference characters indicate corresponding parts throughout the several figures.

In the drawings, FIG. 1 is a schematic view of a remote data acquisition, monitoring and control system 10. The remote data acquisition, monitoring and control system 10 includes a plurality of sensors 12A–12F, a remote data acquisition system 14, a remote interface device 16, a transmission apparatus 18, a local interface device 20, a central control system 22, a central processing transmission apparatus 24, a workstation 26, a remote controlled switching apparatus 28 and a FFT (Fast Fourier Transform) apparatus 30.

The plurality of sensors 12A–12F is attached or is located in the proximity of a test object 32. The test object 32 includes any suitable object such as a steam turbine, a gas turbine, a generator, a heat recovery boiler, an aircraft engine, a gear unit or the like. The sensors 12A–12F can be vibration sensors, temperature sensors, once per revolution sensors, strain measurement sensors, time code generators, voltage sensors, current sensors, watt meters, VAR meters, speed meters, pressure sensors, microphones, cameras or the like. A vibration sensor can comprise any suitable device such as an accelerometer, a proximity probe, a fiber optic accelerometer or the like. A temperature sensor can comprise any suitable sensor such as a thermocouple, a thermistor, an RTD, an infrared sensor or the like. A once per revolution sensor can comprise any suitable sensor such as a key phaser, a proximity probe or the like. A strain measurement sensor can comprise any suitable sensor such as a strain gauge, thermal strain system or the like.

Sensors 12A–12F include a signal conditioners 34A–34F to provide a signal from each sensor 12A–12F respectively.

Each sensor 12A–12F is connected by a lead wire 36A–36F, respectively, to an analog to digital converter 38 of the remote data acquisition system 14. The lead wires 36A–36F carry a plurality of sensor signals 40A–40F, respectively to the analog-to-digital converter 38. The analog-to-digital converter 38 converts analog sensor signals 40A–40F into a digitized sensor data signals 42A–42F.

The remote data acquisition system 14 includes a remote data acquisition system processing device 46 and a remote data acquisition storage device 44. The remote data acquisition system processing device 46 or the data acquisition storage device 44 or both comprise any suitable device such as a. processor, microprocessor, computer, personal computer, controller or the like. The remote data acquisition system processing device 46 acquires digitized data signals 42A–42F and the remote data acquisition storage device 44 can store the digitized sensor data signals 42A–42F. A conduit 48 carries digitized sensor data signals 42A–42F and analyzed data signals from the remote data acquisition system 14 to a remote interface device 16. The remote interface device converts each digitized sensor data signal 42A–42F and analyzed data signals into a remote output data signal transmission stream 50. The transmission apparatus 18 carries the remote output data signal transmission stream 50 from the remote interface device 16 to the local interface device 20. Conduit 48 is represented as structure in FIG. 1. However, the transmission apparatus 18 can comprise any suitable transmission link such as an internet connection, a digital subscriber line (DSL) connection, an interface bus connection, a wireless connection, a satellite connection or the like.

The local interface device 20 receives the remote output data signal transmission stream 50 and converts the remote output data signal transmission stream 50 into a digital central control system data input 52. A conduit 54 carries the digital central control system data input 52 from the local interface device 20 to the central control system 22. The central control system 22 includes a central processing system 56, a central storage device 58 and a central output device 60. The central processing system 56, the central storage device 58 or both can comprise any suitable device such as a processor, microprocessor, computer, personal computer, controller or the like. The central processing system 56 analyzes the digital central control system data input 52 and generates a set of central processed data 62. The set of central processed data 62 includes data from each signal sensor 12A–12F. The central storage device 58 can store the digital central control system data input 52 and the set of central processed data 62. The central output device 60 sends the set of central processed data 62 through the central processing transmission apparatus 24 to workstation 26. The central processing transmission apparatus 24 can include any suitable carrier such as an internet connection, a Local Area Network, a cable connection, a general-purpose interface bus (GPIP), a wireless connection, an ethernet connection or the like. The central output device 60 can transmit the set of central processed data 62 to additional workstations, for example, to workstation 26A.

Workstation 26 receives the set of central processed data 62. The workstation 26 includes a display device 64, a workstation processing device 66, a workstation storage device 68, a workstation output device 70, a workstation input device 72, and a workstation audio monitoring system 74. The workstation processing device 66 can comprise any suitable device such as a computer, personal computer, laptop computer or the like. The workstation storage device 68 can store the set of central processed data 62. The workstation storage device 68 can comprise any suitable device such as a hard disk, a writable CD, a flexible disk or the like. The workstation display device 64 comprises a suitable device such as a screen, LCD display, large screen display or the like. The workstation 26 output device 70 comprises a suitable device such as a plotter, a color printer, a printer, an e-mail message system or the like. The workstation audio monitoring system 74 comprises a suitable device such as a speaker 78, surround sound system, earphones or the like. The workstation input device 72 comprises a suitable device such as a keyboard 80, a mouse 82, a wireless mouse 84 or the like. In the embodiment shown, central control system 22 includes an alarm apparatus 84 that generates an alarm trigger signal 86 whenever the digitized sensor data signal 42 exceeds a preset alarm level. The central processing transmission apparatus 24 carries the alarm trigger signal 86 from the central processing system 56 to the workstation 26. An audio alarm system 88 in the workstation 26 transmits an audible and/or visual alarm to alert an operator 76. The operator hears the audible alarm through the workstation audio monitoring system 74 and sees an alert message on the workstation display device 64. Additionally, the operator 76 can observe sensor signal 40 exceeding a preset threshold alarm level.

The operator 76 uses the workstation input device 72 to input a selected sensor command 90 to select a sensor signal 40, for example 40E, from the plurality of sensors 12A–12F. The selected sensor command 90 can be transmitted in any suitable format such as a general purpose interface bus (GPIB). The selected sensor command 90 is transmitted from the workstation 26 through the central processing transmission apparatus 24 to the central control system 22. From the central control system 22 the selected sensor command 90 travels through the local interface device 20, through the transmission apparatus 18, through the remote interface device 16 and through a control cable 92 to the remote controlled switching apparatus 28. The remote controlled switching apparatus 28 receives the selected sensor command 90 and switches to the selected sensor signal 40, for example, 40E. In this example, sensor 12E is the operator selected sensor. The sensor signal 40E is connected through the remote controlled switching apparatus 28, through a conduit 100 to the FFT apparatus 30. The remote controlled switching apparatus 28 is able to individually select any one of the sensor signals 40A–40F. Thus, the operator 76 can select any one of the sensor signals 40A–40F to be sent to FFT apparatus 30. The FFT apparatus 30 includes an FFT processing device 102 and an FFT memory device 104. The FFT processing device 102 comprises a suitable device such as a processor, microprocessor, personal computer, controller or the like. The FFT processing device 102 performs a Fourier transform on the sensor signal (in this example 40E). The Fourier transform changes the sensor signal 40E from a time domain display to a frequency domain display.

Figure 2:
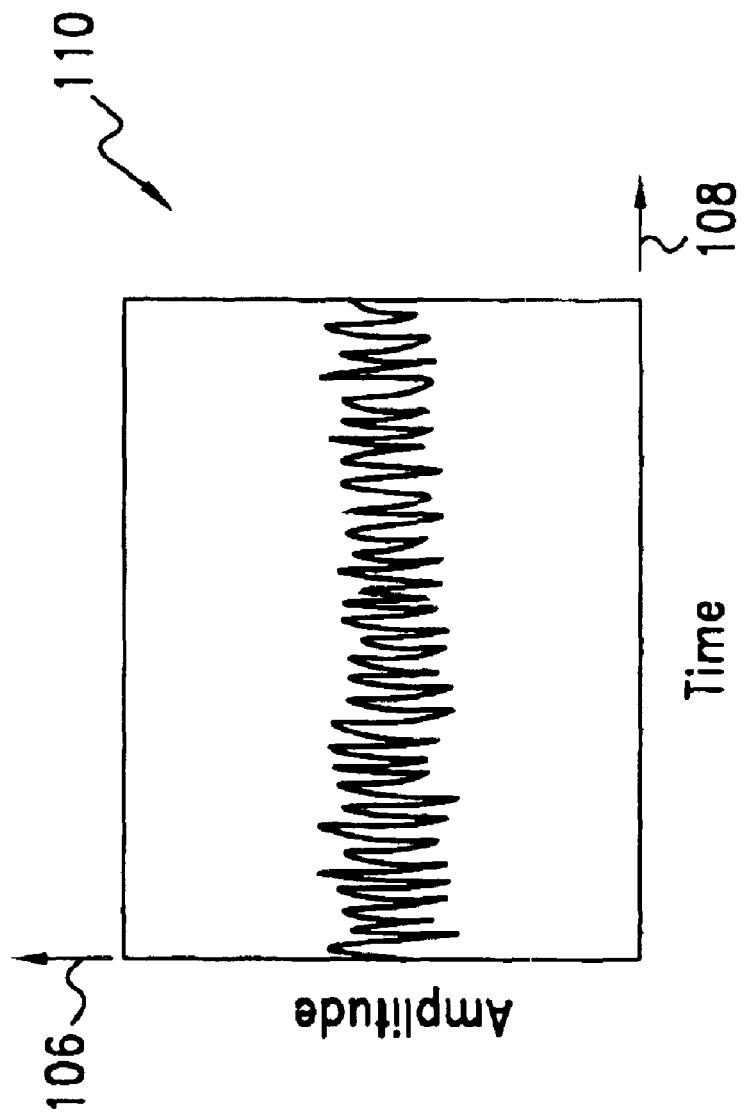
FIG. 2 illustrates a time domain display.

FIG. 2 illustrates a time domain display 110 that displays an amplitude 106 of the A signal versus a time axis 108. Typically, vibrational data is sampled at least twice a desired frequency. For example if 50 kHz is a desired frequency, then the sampling frequency is at least 100 kHz. Data acquisition system 14 may not be capable of a transmission rate for sending a 100 kHz sampled frequency through remote interface device 14 to the workstation 26. In such an instance, the FFT advantageously transforms the time domain sensor 40E signal to a transmittable frequency domain signal.

Figure 3:
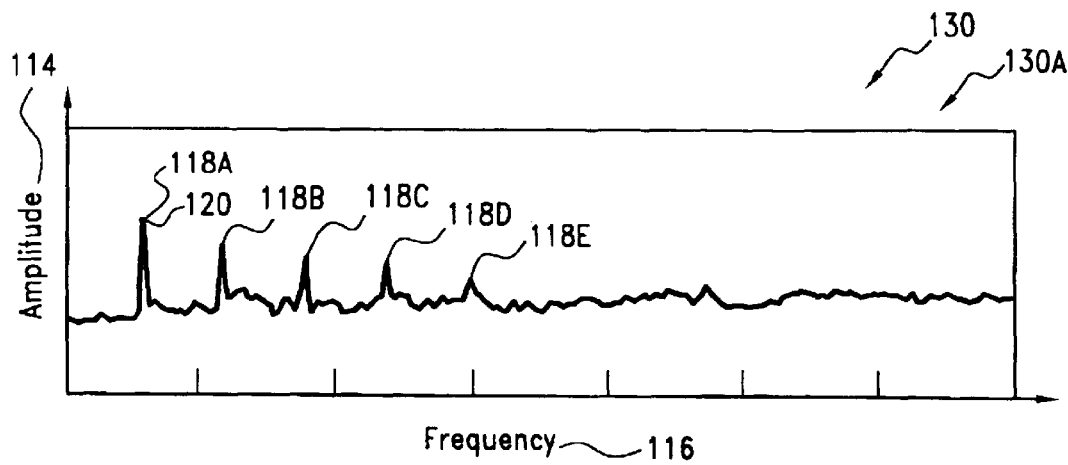
FIG. 3 illustrates a frequency domain spectral display including an amplitude versus frequency plot.

FIG. 3 illustrates a type of FFT display 130 called a spectral frequency domain display 130A. In this embodiment, FFT apparatus 30 transforms a time domain display 110 to a spectral frequency domain display 130A. The spectral frequency domain display 130A includes a spectral amplitude 114 versus frequency 116 display. The spectral frequency domain display 130A, shows resonant peaks 118A–118E. The frequency and amplitude of these resonant peaks 118A–118E represents useful, easy to understand data to operator 76.

The spectral frequency domain display 130A can be averaged to reduce any random noise components and to smooth the spectral frequency domain display. The spectral frequency domain display 130A can be averaged with any suitable number of averages such as a 16, 32 or 64. The frequency domain display 130A can be displayed in as few as 100 to 400 points of data. These 100 to 400 points or lines of data can be easily and quickly transmitted from an FFT output device 105 through a conduit 124, through the remote interface device 16, through transmission apparatus 18, through local interface device 20, through conduit 54, through central control system 22, through the central processing transmission apparatus 24 and to the workstation 26 (FIG. 1).

Operator 76 can use workstation input device 72 to input an FFT control command 122 into workstation 26. The FFT command 122 is transmitted to the FFT apparatus 30 through central processing transmission apparatus 24, central control system 22, local interface device 20, transmission apparatus 18, remote interface device 16, and conduit 124 to the FFT apparatus 30.

The FFT control command 122 represents a suitable carrier such as a GPIB. Generally, the FFT control command 122 allows operator 76 to operate the FFT apparatus 30. The control command 122 allows operator 76 to select FFT apparatus 30 functions and FFT displays 130 including a cursor 120 control, spectrum averaging, an octave display 130B and a waterfall display 130C. Operator 76 can view the FFT display 130 on display device 64 of workstation 26. FIG. 3 illustrates an example of the operator 76 controlling the cursor 120 to be placed on resonant peak 118A. Then the operator can read the amplitude 114 and frequency 116 of the resonant peak 118A.

Figure 4:
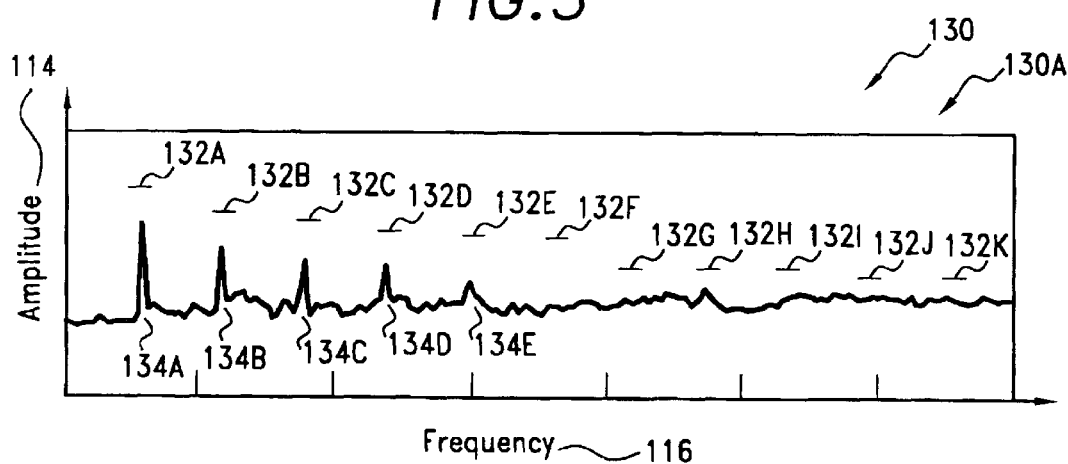
FIG. 4 is a spectral display of FIG. 3 further including a plurality of preselected harmonic peak limit levels.

FIG. 4 shows the spectral display 130A of FIG. 3 including a plurality of preselected harmonic peak limit levels 132A–132K. Additionally, FIG. 4 illustrates a first harmonic peak 134A, a second harmonic peak 134B, a third harmonic peak 134C, a forth harmonic peak 134D and a fifth harmonic peak 134E.

Figure 5:
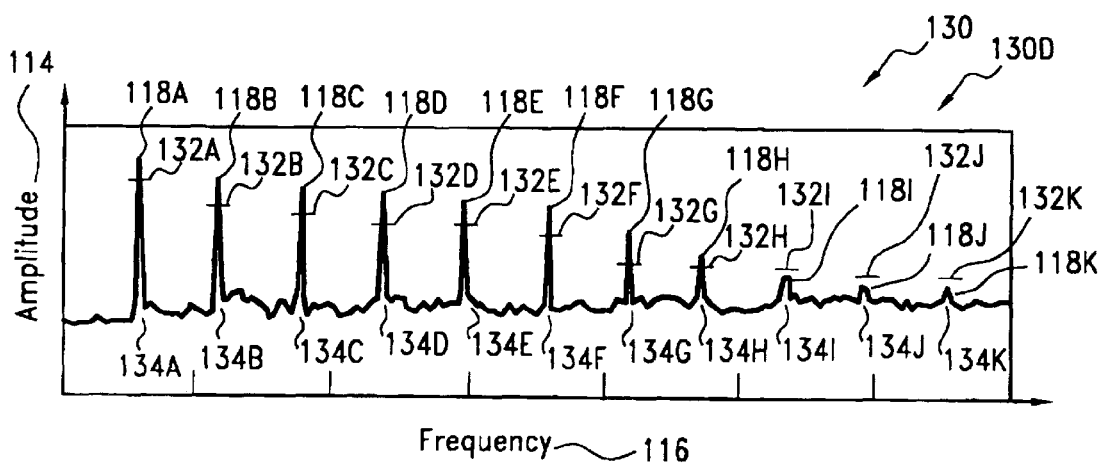
FIG. 5 illustrates a testing condition display wherein harmonic peak levels have exceeded at least one selected harmonic peak threshold level.

FIG. 5 shows a spectral display 130D illustrating a circumstance where there have been vibrational changes in test object 32. A comparison of the spectral display 130A with the display 130D, shows that resonant peak levels 118A–118K have increased in amplitude 114. Resonant peak levels 118A–118H have exceeded preselected harmonic threshold levels 132A–132H. In this instance, an operator 76 can recommend that testing be stopped. The test object 32 can then be inspected and repaired before additional damage can occur.

A comparison of the spectral display 130A (FIGS. 3 and 4) with 130D (FIG. 5), shows an increase in number of harmonic peaks 134A–134K. Spectral display 130A shows 5 harmonic peaks 134A–134E, while spectral display 130D shows 11 harmonic peaks 134A–134K. In this instance, an operator 76 can determine that a test should be terminated. For example, if a preselected threshold number of harmonic peaks is 7, an operator 76 will recommend termination of a test when the preselected maximum number of harmonic peaks 134A–134K has been exceeded. The test object 32 can then be inspected and repaired before additional damage can occur.

Figure 6:
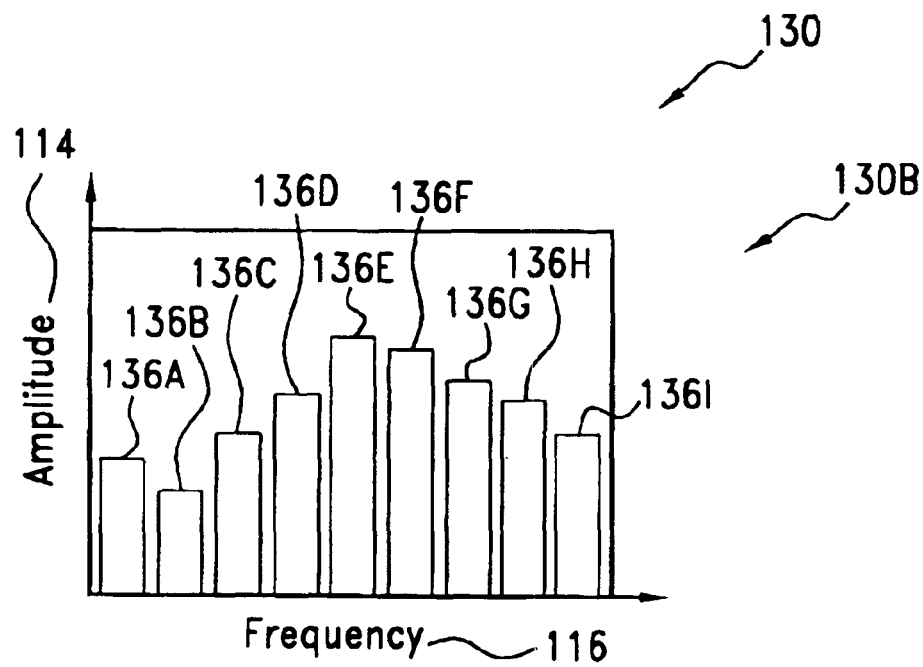
FIG. 6 illustrates an octave band FFT display.

FIG. 6 illustrates another remotely selected FFT display 130. The FFT display 130 includes octave band display 130B provided by the FFT apparatus 30. The octave band display 130B includes a plot of amplitude 114 versus frequency 116 for a plurality of octave bands 136A–136I. The frequency range specified by each octave band falls between two frequencies that have a ratio of 2:1. Typical center frequencies of octave bands 136A–136I can comprise, for example, 31.5, 63, 125, 250, 500, 1000, 2000, 4000, and 8000 Hz. Fractional octave band analysis subdivides octave bands 136A–136I. A ⅓ octave display comprises three bands per octave, a ⅙ octave display comprises 6 bands per octave, a ¹⁄₁₂ octave display comprises 12 bands per octave, and a ¹⁄₂₄ octave display comprises 24 bands per octave.

Figure 7:
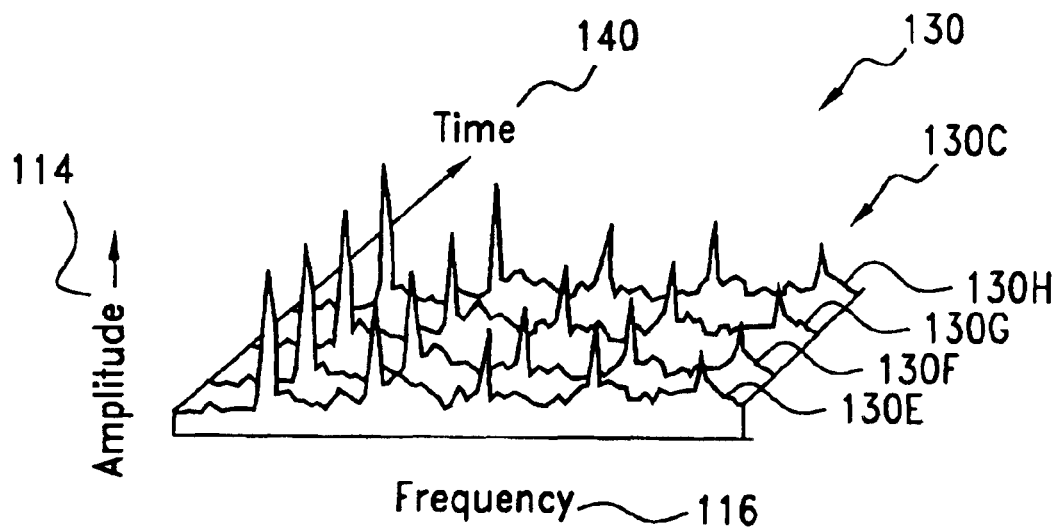
FIG. 7 illustrates a waterfall FFT display.

FIG. 7 illustrates another remotely selected FFT display 130. In this figure, FFT display 130 includes waterfall display 130C, which includes a 3 dimensional graph showing a plurality of spectrum plots 130E–130H. Each spectrum plot 130E–130H comprises a plot of amplitude 114 versus frequency 116 in two directions. Additionally, each spectrum plot 130E–130H is shown as a function of time 140 in a third direction.

In the instance of FIG. 7, an operator 76 can selectively control sensor signal 40A–40F that is applied to the FFT apparatus 30, and additionally, the operator 76 can remotely control the FFT apparatus 30 and view the FFT display 130 on the workstation display device 64. The operator 76 can use the workstation output device 70 to plot a hard copy of the FFT display 130 or can output the FFT display 130 by e-mail to another location.

Additionally, the operator 76 can view the test object 32 with a sensor 12 that includes a camera. The camera can transmit an image of test object 32 through the remote data acquisition system 14 to the workstation display device 64 of workstation 26. The camera can comprise any suitable device such as a web cam, video cam, digital camera and the like. A camera image can be transmitted from the remote data acquisition system 14 to the workstation 26 in any suitable format such as a streaming video, a snap shot or the like.

In another illustration, an operator 76 listens to a sensor signal 40 using a workstation audio monitoring system 74. For example, if sensor 12F is a microphone, the operator can monitor the test object 32 for abnormal noises such as a knocking or buzzing noise. The audio signal 142 can be transmitted from the sensor 12F to the workstation 26 in any suitable format such as real audio, MP3 or the like.

While preferred embodiments of the invention have been described, the present invention is capable of variation and modification and therefore should not be limited to the precise details of the Examples. The invention includes changes and alterations that fall within the purview of the following claims.

What is claimed is:

1. A system comprising:
   a remotely situated plurality of sensors that sense information;
   a locally situated workstation that receives the information from the remotely situated plurality of sensors in the form of a set of data; and
   a Fast Fourier Transform (FFT) analyzer interfaced with the plurality of sensors and workstation to receive in information from the plurality of sensors in the form of time domain data points, to transform the data points into a lesser number of frequency domain data points to facilitate transmission as a set of data from the plurality of sensors to the locally situated workstation; wherein the FFT analyzer comprises a display selected from the group consisting of, a ⅓ octave display, a ¹⁄₁₂ octave display, a ¹⁄₂₄ octave display, and an at least 100 line display.

2. The system of claim 1, wherein said FFT analyzer is interfaced with the workstation to receive an input from the workstation to control the plurality of sensors.

3. The system of claim 1, wherein the plurality of sensors monitors a test object and generates sensor signals.

4. The system of claim 1, wherein the plurality of sensors monitors a test object and generates sensor signals, the system comprising a data acquisition system that acquires the sensor signals from the plurality of sensors and digitizes the plurality of sensors into a digitized sensor data signal using an analog-to-digital converter device.

5. The system of claim 1, wherein the plurality of sensors comprise a vibration sensor.

6. The system of claim 1, wherein the plurality of sensory comprise a vibration sensor selected from the group consisting of an accelerometer, a proximity probe and a fiber optic accelerometer.

7. The system of claim 1, wherein the plurality of sensors comprise a temperature sensor.

8. The system of claim 1, wherein the plurality of sensors comprise a temperature sensor selected from the group consisting of a thermocouple, a thermistor, an RTD and an infrared sensor.

9. The system of claim 1, wherein the plurality of sensors comprise a probe that provides a once per revolution signal.

10. The system of claim 1, wherein the plurality of sensors comprise a strain measurement sensor.

11. The system of claim 1, wherein the plurality of sensors comprise a strain measurement sensor selected from the group consisting of a strain gauge and a thermal strain system.

12. The system of claim 1, wherein the plurality of sensors comprise a time code generator that provides a measure of time.

13. The system of claim 1, wherein the plurality of sensors comprise a voltage sensor.

14. The system of claim 1, wherein the plurality of sensors comprise a current sensor.

15. The system of claim 1, wherein the plurality of sensors comprise a current sensor selected from the group consisting of a Watt meter, a Vars meter and a speed meter.

16. The system of claim 1, wherein the plurality of sensors comprise a pressure sensor.

17. The system of claim 1, wherein the plurality of sensors comprise a microphone.

18. The system of claim 1, wherein the plurality of sensors comprise a camera.

19. The system of claim 1, additionally comprising a central control system that includes an alarm apparatus that generates an alarm trigger whenever a sensed digitized data signal exceeds a selected alarm threshold.

20. The system of claim 1, wherein the workstation includes an audio monitoring system that allows an operator to hear a sensor signal.

21. The system of claim 1, wherein the workstation comprises an audio monitoring system selected from the group consisting of a speaker, a surround sound speaker system, and a headphone.

22. The system of claim 1, wherein the workstation comprises an output device selected from the group consisting of a plotter, a color printer, an e-mail message system and a printer.

23. The system of claim 1, wherein the workstation comprises a processing device and a storage device selected from the group consisting of a hard disk, a writable CD and a flexible disk.

24. The system of claim 1, wherein the FFT analyzer comprises a display of averaged data to reduce random signal fluctuations.

25. The system of claim 1, used to monitor a test object selected from the group consisting of a steam turbine, a gas turbine, a generator, a heat recovery boiler, an aircraft engine and a gear unit.

26. The system of claim 1, wherein the workstation comprises an input device selected from the group consisting of a keyboard, a mouse and a wireless mouse.

27. The system of claim 1, wherein the FFT is remotely situated in association with the plurality of sensors.

28. The system of claim 27, further comprising a switching apparatus remotely situated and controllably connected to the plurality of sensors to permit selection of a sensor of the plurality from the workstation.

29. A method comprising:
  remotely monitoring an operating test object with a plurality of sensors to generate time domain data points;
  remotely transforming the time domain data points to frequency domain data points with a Fast Fourier Transform (FFT) analyzer; and
  transmitting the frequency domain data points to a local workstation;
  wherein a display is generated from the time domain data points, the display comprising, a ⅓ octave display, a 1/12 octave display, a 1/24 octave display, or an at least 100 line display.

30. The method of claim 29, wherein said FFT analyzer receives an input from the workstation to control the plurality of sensors.

31. The method of claim 29, additionally comprising monitoring a test object with the plurality of sensors and generating sensor signals from the monitoring.

32. The method of claim 29, additionally comprising monitoring a test object with the plurality of sensors, generating sensor signals from the monitoring and acquiring the sensor signals with a data acquisition system that digitizes the plurality of sensors into digitized sensor data signals.

33. The method of claim 29, wherein the plurality of sensors generate vibration data points.

34. The method of claim 29, wherein the plurality of sensors generate temperature data points.

35. The method of claim 29, wherein the plurality of sensors generate once per revolution signal data points.

36. The method of claim 29, wherein the plurality of sensors generate measurement signal data points.

37. The method of claim 29, wherein the plurality of sensors generate strain measurement signal data points.

38. The method of claim 29, wherein the plurality of sensors generate time coded signal data points.

39. The method of claim 29, wherein the plurality of sensors generate voltage signal data points.

40. The method of claim 29, wherein the plurality of sensors generate measurement current data points.

41. The method of claim 29, wherein the plurality of sensors generate pressure signal data points.

42. The method of claim 29, wherein the plurality of sensors generate sound signal data points.

43. The method of claim 29, wherein the plurality of sensors generate visual signal data points.

44. The method of claim 29, comprising sensing the frequency domain data points at the workstation and generating an alarm whenever a sensed digitized data signal exceeds a selected alarm threshold.

45. The method of claim 29, further comprising generating a display of averaged data to reduce random signal fluctuations from the time domain data point.

46. The method of claim 29, comprising monitoring an operating test object selected from the group consisting of a steam turbine, a gas turbine, a generator, a heat recovery boiler, an aircraft engine and a gear unit.

* * * * *